UNITED STATES PATENT OFFICE

ROBERT M. DAY, OF CAMBRIDGE, MASSACHUSETTS, ASSIGNOR TO DEWEY AND ALMY CHEMICAL COMPANY, OF CAMBRIDGE, MASSACHUSETTS, A CORPORATION OF MASSACHUSETTS

RUBBER BONDED ASBESTOS AND METHOD OF MAKING

No Drawing.   Application filed June 10, 1930.   Serial No. 460,294.

This invention relates to a process for making rubber bonded asbestos articles.

It has sometimes been proposed to add latex or other dispersions of rubber together with a colloid protective to an extremely dilute slurry of asbestos in a paper-making beater and thereafter to add a coagulant reagent for the dispersed rubber capable of overcoming the protective effect of the colloid protective whereby coagulation is induced. Because of the great dilution, such coagulation results in the formation of rubber aggregates which are subsequently caught by the fiber when the latter is assembled on the screen of a usual paper-making machine. This process is open to the serious objection that because of paper-making requirements a thorough dispersion of the fiber is not permissible. It is "too slow" on the screen; but unless thoroughly dispersed the fiber tends to remain in unopened bundles. Furthermore, as the rubber dispersion is irregularly coagulated, in the presence of a protective capable of preventing coagulation by the asbestos, the fineness of subdivision of the rubber in the dispersion is lost in the formation of relatively large aggregates with the result that the fibers are bonded by dispersed particles of coagulum which contact but a relatively small part of the total fiber surface. Where large amounts of bonding rubber may be used this objection is perhaps not so serious but in elements where the organic bonding constituent of the product should be a minimum it may be of primary importance. There is the still further objection to this process which is perhaps the most serious of all and that is that the water-borne fibers deposited from the water on the separating screen of a paper-making machine are interlocking in but two dimensions only and in one of these the interlock is usually relatively less than the other, i. e., the longitudinal interlock is usually greater than the transverse interlock. Such arrangement of fibers produces a sheet having a greater longitudinal than transverse tensile strength as well as the characteristic striations of paper products. This striation or lamination is detrimental in several respects, among which may be mentioned the fact that striated fibrous material tends to split when subjected to bending strains, and surface fibers subjected to frictional strain resist this strain by reason of the bonding agent alone quite unsupported by fiber interlock with the underlying layers.

Heretofore asbestos slurries containing protected latex have been wet cast or wet molded and the solidification of rubber produced by desiccation. This process is not only commercially impracticable because of the excessive time required to remove the watery component from such masses of fiber by desiccation but because, as drying proceeds, the rubber tends to become concentrated at the surface. It has also been proposed to add a coagulant to a mixture of protected latex and fibers and thereafter to give form to the shapeless mass of coagulated rubber bonding the fibers, by molding. This process is quite unsuited to the production of a uniform grainless texture material having high tensile strength because of the fact that it is traversed in all directions by the boundaries of the original masses of coagulated rubber and fiber. These boundaries constitute cleavage lines at which the fibers stop and consequently represent lines of unreinforced rubber bond of obviously great weakness as compared to the fiber reinforced rubber.

It is an object of this invention to produce a "molded" rubber bonded asbestos article which shall be free of the objectionable features above mentioned. It is a further object of this invention to produce a non-woven sheet asbestos in which the fibers are not only randomly arranged in one plane but in which a large proportion of the fibers have a component normal to this plane, thereby eliminating striations within the sheet and producing a sheet having substantially equal tensile strengths however measured in the plane of the major surfaces. And it is a further object of this invention to produce a rubber bonded asbestos article in which substantially all of the free surface of the fiber is covered by the rubber of the bond. Another object of the invention is to utilize very short asbestos fiber and to so disperse and open up this fiber that the maximum possible interlock is obtained whereby tensile strengths are obtainable which by heretofore practiced processes were achieved only by the use of relatively long and expensive fiber.

The method of the invention in general comprises thoroughly wetting relatively short asbestos fiber with a water solution of a dispersing agent and thereafter dispersing, in the so-formed fiber slurry, pigments, fillers, and/or vulcanizing agents as desired and subsequently concentrating the fibers by mechanical extraction of the major part of the said watery solution without however permitting complete desiccation of the fiber and thereafter disseminating colloid particles of rubber throughout the so-formed wet fiber mass from a natural or artificial dispersion thereof containing a protective capable of protecting the said rubber dispersion from coagulation by the coagulative influence of the asbestos fiber, and that of any other coagulant which may be present, at room temperature but preferably nullifiable at elevated temperatures,—approximately the boiling point of water—and sometimes but not always containing a potential coagulant ineffective in the presence of said protective at room temperature but capable of exerting a coagulative influence when the temperature is raised to a value such as the boiling point; and it further consists in applying heat exteriorly of the mutual dispersion of fiber, rubber, vulcanizing agents and pigments to raise the temperature to a value approximating the boiling point whereby the protective effect of the said protective is nullified and the coagulative influences are free to precipitate the rubber upon the fiber while said fiber is held dispersed in a fortuitous random arrangement which arrangement, in plane dimensions parallel to the major surfaces, persists substantially unchanged in the final product. Thereafter the water constituent of the slurry is removed by simple desiccation or by partial extraction by pressure and the remainder removed by subsequent desiccation in any convenient manner. The dried assemblage of rubber treated randomly arranged interlocking fibers, thus obtained may be further compacted, as by passing the formed mass between pressure rolls and subsequently modifying the form of the shaped mass, as for example from rectilinear to curvilinear contours as by molding or wrapping the mass about a cylinder, and vulcanizing in contact with a forming surface, (such as the cylinder as stated) all as more fully hereinafter described and claimed.

My process may be practised by several modes of operation so far as the preliminary mutual dispersions of fiber pigments and rubber are concerned but whatever the mode of preparation it is signalized by the fact that the fibers are assembled in a fortuitous random arrangement in three dimensions, preferably while in a concentrated slurry and before coagulation or precipitation of the rubber and in a forming container and thereafter heated to cause coagulation and precipitation of the rubber around the fibers without disturbances of the fiber relationship in the horizontal plane and limiting the change of relative position of the fibers to such change in their vertical component only, as may be produced by substantially vertical compression.

Accordingly an essential of my invention resides in the proximate positioning of dispersed fibers in the presence of uncoagulated latex and thereafter coagulating the latex without disturbing the proximate relationship of the fibers excepting only as the vertical component of these fibers is reduced in angle towards the horizontal by compacting pressure.

In the preferred embodiment of my invention I disperse short asbestos fiber in a large amount of water containing a dispersing agent. A concentration of three to five percent fiber will serve my purpose. A paper maker's beating engine may be satisfactorily used or any other agitating device which admits of violent agitation of the fiber in the dispersing solution. The effect of a dispersing agent such as caustic soda is microscopically visible. Without the dispersing agent the small fiber bundles cling together like the fibers in a wet shaving brush and tend to sink in water. Fibers thoroughly agitated in the presence of a suitable dispersing agent exhibit a marked change in appearance and "in feel", the mass appears slimy and feels unctuous and the fibers do not sink as rapidly nor do they form as compact a layer. Under the microscope the change in appearance of these fibers due to the dispersing agent is very striking and at suitable magnifications it is observed that all the free tendrils of fiber tend to behave as though they were mutually repellent. Such an unctuous slurry is "slow" as stated. It may not be readily handled in the usual paper-making apparatus as it tenaciously holds far too much water. Even when attempts are made to concentrate the slurry in a basket-type centrifuge it is found that after a layer of $\frac{1}{16}$th to $\frac{3}{32}$nds of an inch has been built up further deposition becomes very tedious if not substantially impossible. Water will not pass through the dense fiber structure resulting.

After the fiber is deemed to be thoroughly dispersed, which condition is readily observable by reason of its slimy appearance and unctuous "feel", such pigments and fillers may be added as fancy or expediency dictate. Finely divided sulphur and zinc oxide may also be added in such amounts as to allow a satisfactory cure of the finished product which will include rubber. The ratio of vulcanizing agents to the intended rubber inclusions will be clearly indicated to those skilled in the art by the characteristics desired in the finished product. Where variant rubber ratios are used the vulcanizing agents may be varied accordingly. The finely divided fillers and vulcanizing agents become adsorbed on the fiber surface or entrained in the reticulate fiber network and the mutual dispersion of fiber, pigments and vulcanizing agents may readily be concentrated by the removal of part of the suspending water without the entrainment by this water of these finely divided materials. The excess water may be removed in any convenient manner such as a thickener or a pressure filter box. The moisture content is reduced until the mass loses its free mobility.

To this wet although non-fluid mass a water dispersion of rubber is added which may be either that naturally occurring dispersion known as rubber latex or an artificial dispersion. In any event a colloid protective is added to the rubber dispersion. Any of the well known protectives may be used although heat coagulable proteins are to be preferred, of which hemoglobin is perhaps the most satisfactory. An addition of a small amount of zinc hydroxide or zinc oxide, added to the original slurry, will expedite later coagulation. Fifteen percentum of rubber taken on the weight of the fiber is a suitable ratio of bonding rubber to fiber, and the addition of rubber in this ratio and in the form of latex of normal concentration, i. e. 30 percent rubber, is enough to impart sufficient mobility to the wet fibers for my purpose. The mass thus formed has the appearance of a soft mud and may be readily poured into a receptacle. The receptacle may be subjected to a vibratory motion, or rapping impact, as distinguished from stirring which assists in uniformly distributing the fibers within the container but without changing the indiscriminate, fortuitous random arrangement thereof. Then, maintaining the container in a horizontal plane, apply heat exteriorly. This may be accomplished in any convenient manner, preferably by running the container into a closed chamber and there subjecting it to steam. Agitation is avoided while heating and particularly the agitation that is produced by violent ebullition. After the mass has been raised to a temperature approximating the boiling point a marked change in consistency results; the fiber now has more nearly the appearance of ordinary wet asbestos which has not been subjected to dispersion with the aid of dispersing agents.

Furthermore, it will be noticed that clear water quite free from rubber tends to flow out of the so-formed mass indicating that all of the rubber has been coagulated within the fiber mass. Microscopic examination of the individual fibers clearly indicates that they are severally surrounded by rubber coagula. Given a sufficiency of rubber substantially all of the free surfaces of the fibers are covered with rubber.

Removal of the aqueous fluid remaining may be effected by desiccation. Preferably, however, as a preliminary step pressure is applied normal to the exposed surface which displaces a large portion of the fluid by the resulting compaction of the fibers. It is to be noted that this pressure applied in a direction normal to the exposed surface does not change the relative position of the fibers lying parallel to the surface but does diminish the vertical component of the fibers lying at an angle thereto. A plunger of slightly less area than the said exposed surface may be used, thereby permitting the water to flow up and around the edges of the plunger and sometimes a screen, preferably of filter-type weave, may be interposed between either the upper or lower exposed surfaces, or both, and perforated pressure platens. It is obvious that many modifications in mode of operation will suggest themselves to those skilled in the art. However the prime requisite of any satisfactory means of partial diminution of one dimension of the formed mass is that this operation avoids any substantial disturbance of the relative position of the fibers lying parallel to the exposed surface, i. e., normal to the direction of the compacting pressure.

At this stage the mass has sufficient coherence, presumably due to the intimate interlock or "felting" of the fibers, to exhibit a surprising "wet strength". The mass may be turned out of the container in which it was formed and transferred to an appropriate drying apparatus without the need of any edge support. Because of the "wet strength" just mentioned the mass may be subdivided as by cutting into commercially suitable units. Where trimming waste results this may be added to the next batch of fiber to be dispersed. Notwithstanding the adherent rubber it will be found that fiber treated as above will be almost as readily redispersed as before treatment. This is of advantage.

Final desiccation may be accomplished in any convenient manner. However, the drying temperature should be maintained at a sufficient low value to avoid vulcanization of the rubber. The rubber, however, during desiccation may be held at a temperature of 150° F. without detriment.

After the mass is dry it is subjected to pressure to reduce the remaining interstices and to bring the rubber coagula and fiber into contact whereby the rubber becomes welded into a continuous whole. This compacting pressure should be applied in the same direction as that previously used to expel the major portion of the water and for the reasons stated ante. It may be expedient, however, to apply the final compacting pressure by passing the dry mass between pressure rolls, particularly to effect a slight displacement of those fibers having a vertical component whereby greater flexibility, in one direction at least, and density, may be imparted to the mass.

Vulcanization may be accomplished in any convenient manner and a choice of a mode of operation suitable to the particular shaped finished product will be clearly indicated to anyone skilled in the art.

The product of my invention is characterized by an almost entire absence of grain texture and further by the fact that it has almost exactly the same strength in all directions in the plane in which the fibers have suffered no change of relative position after precipitation of the rubber thereupon. It is further characterized by the fact that it will not split parallel to its major surfaces. It is thought that there is an intermesh of fibers extending at an angle to the surfaces down into and through the mass and that it is this angular interlock of fibers having a component normal to the said surfaces which accounts for the complete absence of striations parallel to the surfaces.

Other modifications in mode of operation may suggest themselves to those skilled in the art but I do not wish to be limited excepting only as my invention is defined in the following claims.

I claim:

1. The process of forming articles of rubber bonded asbestos fibers which comprises heating a mutual dispersion of asbestos fibers and colloidal rubber particles in aqueous suspension with a colloid protective without agitation thereof, whereby said rubber is coagulated about said fibers while the relative position of said fibers is maintained substantially unchanged and thereafter removing the aqueous dispersing medium without substantially changing, in one plane at least, the relative position of said fibers and subsequently compacting the so-formed mass to effect the rubber bonding of the asbestos fibers thereof.

2. The process of forming articles of rubber bonded asbestos fibers which comprises heating a mutual dispersion of asbestos fibers and colloidal rubber particles in an aqueous solution of a colloid protective, without agitation thereof whereby said rubber is coagulated about said fibers while the relative position of said fibers is maintained substantially unchanged and thereafter removing the aqueous dispersing medium without substantially changing, in one plane at least, the relative position of said fibers and subsequently compacting the so-formed mass to effect the rubber bonding of the asbestos fibers thereof by pressure applied approximately normal to said plane.

3. The process of forming articles of rubber bonded asbestos fibers which comprises heating a mutual dispersion of asbestos fibers and colloidal rubber particles and vulcanizing agents, in an aqueous solution of a colloid protective, without agitation thereof, whereby said rubber is coagulated about said fibers while the relative position of said fibers is maintained substantially unchanged and after removing the aqueous dispersing medium without substantially changing, in one plane at least, the relative position of said fibers, and subsequently compacting the so-formed mass to effect the rubber bonding of the asbestos fibers thereof by pressure applied approximately normal to said plane and subjecting the same to heat, whereby the said rubber, bonding the asbestos fibers, is vulcanized.

Signed by me at Cambridge, Massachusetts, this sixth day of June, 1930.

ROBERT M. DAY.